United States Patent
Bulava et al.

(10) Patent No.: US 10,715,574 B2
(45) Date of Patent: Jul. 14, 2020

(54) SYSTEMS AND METHODS FOR FRAME DUPLICATION AND FRAME EXTENSION IN LIVE VIDEO ENCODING AND STREAMING

(71) Applicant: DIVX, LLC, San Diego, CA (US)

(72) Inventors: Yuri Bulava, Tomsk (RU); Pavel Potapov, Tomsk (RU)

(73) Assignee: DIVX, LLC, San Diego, CA (US)

( * ) Notice: Subject to any disclaimer, the term of this patent is extended or adjusted under 35 U.S.C. 154(b) by 379 days.

(21) Appl. No.: 15/055,467

(22) Filed: Feb. 26, 2016

(65) Prior Publication Data

US 2016/0255131 A1 Sep. 1, 2016

Related U.S. Application Data

(60) Provisional application No. 62/126,393, filed on Feb. 27, 2015.

(51) Int. Cl.
    *H04L 29/08* (2006.01)
    *H04L 29/06* (2006.01)
    *H04L 12/26* (2006.01)

(52) U.S. Cl.
    CPC .......... *H04L 65/607* (2013.01); *H04L 65/601* (2013.01); *H04L 65/605* (2013.01); *H04L 67/02* (2013.01)

(58) Field of Classification Search
    CPC ..... H04L 65/608; H04L 67/32; H04L 65/601; G06F 11/08
    See application file for complete search history.

(56) References Cited

U.S. PATENT DOCUMENTS

| 7,339,993 B1 | 3/2008 | Brooks et al. |
| 8,532,171 B1 * | 9/2013 | Narayanan ......... H04N 21/8451 375/240.01 |
| 8,752,113 B1 | 6/2014 | Good et al. |

(Continued)

FOREIGN PATENT DOCUMENTS

| CN | 101933009 A | 12/2010 |
| CN | 103503454 A | 1/2014 |

(Continued)

OTHER PUBLICATIONS

International Preliminary Report on Patentability for International Application PCT/US2016/019955, Report dated Aug. 29, 2017, dated Sep. 8, 2017, 6 Pgs.

(Continued)

*Primary Examiner* — Kevin T Bates
*Assistant Examiner* — Mark A Scott
(74) *Attorney, Agent, or Firm* — KPPB LLP

(57) ABSTRACT

Embodiments of the invention provide for live encoding systems that can replicate a current encoded frame instead of re-encoding said current frame, and then adjust the replicated frame to different bitrates, resolutions, and/or contexts as necessary for the several different adaptive bitrate streams. In addition, various embodiments of the invention can extend a duration of a current frame being repackaged and/or re-encoded. Utilizing these and other techniques, live encoding systems in accordance with embodiments of the invention can more efficiently handle gaps in received data, slower feeding of data, and/or heavy loads on server hardware.

18 Claims, 10 Drawing Sheets

(56) References Cited

U.S. PATENT DOCUMENTS

| | | | |
|---|---|---|---|
| 8,896,765 B1 | 11/2014 | White et al. | |
| 2006/0224768 A1* | 10/2006 | Allen | H04L 29/06 709/234 |
| 2011/0105226 A1* | 5/2011 | Perlman | A63F 13/12 463/30 |
| 2011/0206138 A1* | 8/2011 | Yang | H04N 19/159 375/240.26 |
| 2011/0246657 A1* | 10/2011 | Glow | H04L 65/1063 709/231 |
| 2012/0128061 A1* | 5/2012 | Labrozzi | H04N 21/23435 375/240.02 |
| 2012/0259994 A1 | 10/2012 | Gillies et al. | |
| 2012/0307886 A1 | 12/2012 | Agarwal et al. | |
| 2012/0331106 A1* | 12/2012 | Ramamurthy | H04N 21/23432 709/218 |
| 2013/0028088 A1* | 1/2013 | Do | H04L 1/0002 370/235 |
| 2013/0036234 A1 | 2/2013 | Pazos et al. | |
| 2013/0114744 A1* | 5/2013 | Mutton | H04N 19/40 375/240.26 |
| 2013/0272374 A1* | 10/2013 | Eswaran | H04L 65/602 375/240.02 |
| 2013/0282917 A1 | 10/2013 | Reznik et al. | |
| 2013/0290492 A1* | 10/2013 | ElArabawy | H04L 65/80 709/219 |
| 2014/0003491 A1* | 1/2014 | Chen | H04N 19/597 375/240.02 |
| 2014/0013375 A1 | 1/2014 | Giladi | |
| 2014/0019593 A1* | 1/2014 | Reznik | H04L 65/60 709/219 |
| 2014/0032777 A1* | 1/2014 | Yuan | H04L 67/26 709/231 |
| 2014/0082146 A1* | 3/2014 | Bao | H04L 65/605 709/219 |
| 2014/0086336 A1* | 3/2014 | Wang | H04N 19/70 375/240.26 |
| 2014/0169448 A1* | 6/2014 | Wang | H04N 19/70 375/240.02 |
| 2014/0195651 A1* | 7/2014 | Stockhammer | H04N 21/23439 709/219 |
| 2014/0201329 A1* | 7/2014 | Himayat | H04L 12/6418 709/219 |
| 2014/0209493 A1 | 7/2014 | Hale et al. | |
| 2014/0219088 A1* | 8/2014 | Oyman | H04N 21/23439 370/231 |
| 2014/0282766 A1* | 9/2014 | Good | H04L 65/607 725/93 |
| 2014/0351871 A1* | 11/2014 | Bomfim | H04L 65/4084 725/93 |
| 2014/0359680 A1* | 12/2014 | Shivadas | H04N 21/8455 725/90 |
| 2014/0362690 A1* | 12/2014 | Baduge | H04L 69/324 370/230 |
| 2014/0376623 A1* | 12/2014 | Good | H04N 19/46 375/240.07 |
| 2015/0131727 A1* | 5/2015 | Bakke | H04N 19/433 375/240.16 |
| 2015/0201198 A1* | 7/2015 | Marlatt | H04N 19/124 375/240.03 |
| 2015/0230002 A1* | 8/2015 | Brockmann | H04L 67/322 725/126 |
| 2015/0244761 A1* | 8/2015 | Tsyganok | G06F 11/08 709/219 |
| 2015/0264096 A1* | 9/2015 | Swaminathan | H04L 65/4084 709/219 |
| 2015/0264404 A1* | 9/2015 | Hannuksela | H04N 19/70 375/240.16 |
| 2015/0312572 A1* | 10/2015 | Owen | H04N 19/102 375/240.02 |
| 2016/0006817 A1* | 1/2016 | Mitic | H04L 65/4076 709/232 |
| 2016/0029047 A1* | 1/2016 | Spidella | H04N 21/2187 725/93 |
| 2016/0088050 A1* | 3/2016 | Einarsson | H04L 65/607 709/231 |
| 2016/0105728 A1* | 4/2016 | Schmidmer | H04N 21/44008 725/110 |
| 2016/0119657 A1* | 4/2016 | Sun | H04N 21/23406 725/94 |
| 2016/0205164 A1* | 7/2016 | Schmidt | H04L 1/0001 709/219 |
| 2016/0212439 A1* | 7/2016 | Hannuksela | H04N 19/33 |
| 2016/0219023 A1* | 7/2016 | So | H04L 63/0442 |
| 2016/0234504 A1* | 8/2016 | Good | H04N 19/146 |
| 2016/0277781 A1* | 9/2016 | Lennon | H04N 21/2743 |
| 2016/0353148 A1* | 12/2016 | Prins | H04N 21/21805 |
| 2017/0257647 A1* | 9/2017 | Iguchi | H04N 21/231 |
| 2017/0366597 A1* | 12/2017 | Parthasarathy | H04L 41/5067 |
| 2018/0007395 A1* | 1/2018 | Ugur | H04N 21/21805 |

FOREIGN PATENT DOCUMENTS

| | | |
|---|---|---|
| CN | 107251008 A | 10/2017 |
| EP | 3262523 A1 | 1/2018 |
| EP | 3627337 A1 | 3/2020 |
| HK | 1239869 A | 5/2018 |
| HK | 1246423 A | 9/2018 |
| JP | 2006060802 A | 3/2006 |
| JP | 2018511978 A | 4/2018 |
| JP | 6588987 B2 | 9/2019 |
| KR | 10-1897959 B1 | 9/2018 |
| SG | 11201706160 U | 9/2018 |
| WO | 2014209493 A1 | 12/2014 |
| WO | 2016138493 | 9/2016 |
| WO | 2016138493 A1 | 9/2016 |

OTHER PUBLICATIONS

International Search Report and Written Opinion for International Application No. PCT/US2016/019955, Search completed Apr. 13, 2016, dated May 12, 2016, 7 Pgs.

Extended European Search Report for European Application No. 16756526.6, Search completed Jun. 19, 2018 dated Jun. 27, 2018, 7 Pgs.

Search Report for Singapore Application No. 11201706160U, Search completed Jun. 14, 2018, dated Jun. 28, 2018, 7 Pgs.

"Information technology—Dynamic adaptive streaming for HTTP (DASH); Part 1: Media presentation and description and segment formats", International Standard, ISO/IEC 23009-1, Second edition May 15, 2014, 152 pgs.

Extended European Search Report for European Application No. 19206431.9, Search completed Nov. 20, 2019, dated Nov. 27, 2019, 7 pgs.

* cited by examiner

SYSTEMS AND METHODS FOR FRAME DUPLICATION AND FRAME EXTENSION IN LIVE VIDEO ENCODING AND STREAMING

CROSS-REFERENCE TO RELATED APPLICATIONS

The present application claims priority under 35 U.S.C. § 119(e) to U.S. Provisional Patent Application Ser. No. 62/126,393 entitled "Systems and Methods for Frame Duplication and Frame Extension in Live Video Encoding and Streaming" filed Feb. 27, 2015. The disclosure of U.S. Provisional Patent Application Ser. No. 62/126,393 is hereby incorporated by reference herein in their entirety.

FIELD OF THE INVENTION

The present invention generally relates to the field of live encoding of adaptive bitrate streams from live input streams. Specifically, the present invention relates to several techniques for optimizing and improving the live encoding of adaptive bitrate streams from live input streams.

BACKGROUND OF THE INVENTION

Streaming technology has advanced to the point of supporting live over the top streaming. Live events can now be viewed from adaptive bitrate streams generated by live encoding servers. Often, live encoding servers utilize the MPEG-DASH format (i.e., Dynamic Adaptive Streaming over HTTP). MPEG-DASH (ISO/IEC 23009-1) is a standard for streaming multimedia content over the internet. MPEG-DASH was developed by the Moving Picture Expert Group (MPEG). MPEG has been responsible for developing previous multimedia standards, including MPEG-2, MPEG-4, MPEG-7, MPEG-21 and others. MPEG-DASH, is an adaptive bitrate streaming technique that enables high quality streaming of media content over the Internet delivered from conventional HTTP web servers. Typically, MPEG-DASH uses sequences of small files that each contain a segment of video that are retrieved via Hypertext Transfer Protocol (HTTP), each segment containing a short interval of playback time of a presentation. Presentations can be can live events and/or have specified durations. The adaptive bitrate streams can be made available at a variety of different bit rates, such as 300 kb/s, 500 kb/s, and 3 MB/s. Live encoding and/or transcoding of source streams into multiple adaptive bitrate streams can require substantial computing resources and live encoding hardware is fairly expensive.

DETAILED DISCLOSURE OF THE INVENTION

Figure 1:
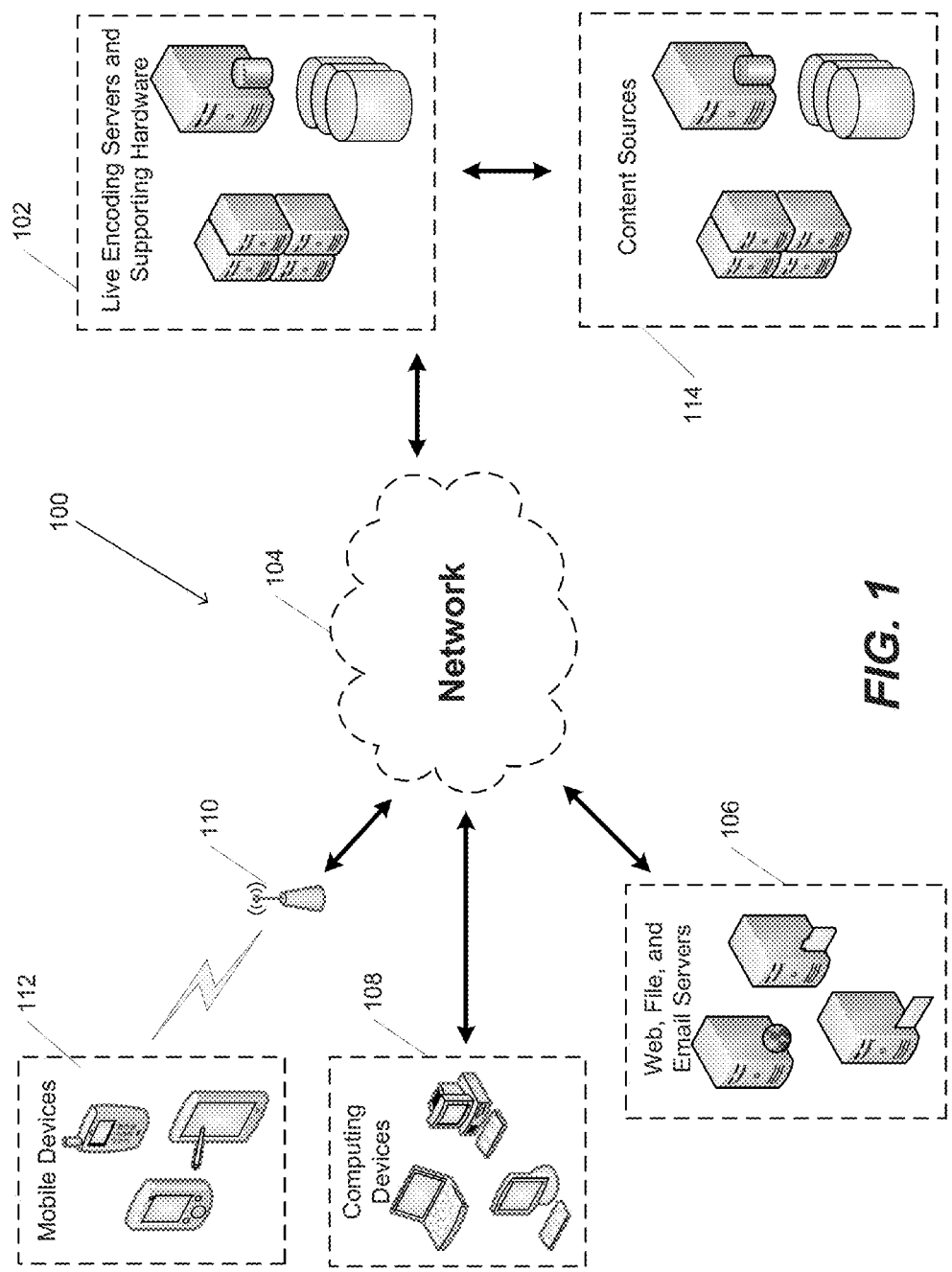
FIG. 1 is a network diagram illustrating a live encoding system in accordance with an embodiment of the invention.

Turning now the drawings, live encoding systems in accordance with embodiments of the invention are illustrated. In several embodiments, the live encoding systems receive live media feeds such as (but not limited to) sporting events, live news coverage, web live streams, and/or singular or multiplexed streams of media. Streams of media contain multimedia that is constantly received by and presented to a client while being delivered by a provider. Streaming refers to the process of delivering media via streams. Live encoding systems can provide streams of media to clients encoded from a live input stream. Moreover, live encoding systems can encode received live media feeds into several different adaptive bitrate streams having different maximum bitrates. The live encoding systems can further transmit the encoded adaptive bitrate streams in live media presentations to streaming clients via protocols including (but not limited to) HTTP requests and/or provide the encoded adaptive bitrate streams to servers for distribution to client devices. Encoding and transmission of live media presentations can be taxing on the hardware used to perform these operations. Embodiments of the invention provide for several techniques to reduce the load on hardware performing live encoding and transmission operations. For instance, live encoding systems in accordance with many embodiments of the invention can assess network and/or server load levels according to several measures. Load is often measured as an amount of work (e.g., computations, encoding operations, memory operations, etc.) a live encoding system is performing. Based on the assessments, the live encoding systems can adjust how frames of video from live media feeds are being encoded. For instance, some embodiments of the live encoding systems replicate a current encoded frame instead of re-encoding said current frame, and then adjust the replicated frame to different bitrates, resolutions, and/or contexts as necessary for the several different adaptive bitrate streams. In addition, various embodiments of the live encoding systems can extend a duration of a current frame being repackaged and/or re-encoded. Utilizing these and other techniques, live encoding systems in accordance with embodiments of the invention can more efficiently handle gaps in received data, slower feeding of data, and/or heavy loads on server hardware.

Network transmission levels can affect live encoding processes. For instance, when a live media feed suffers interruptions in network transmission levels from the live input stream to the live encoding system, the live encoding system may encounter a gap in incoming data. Gaps in incoming data can produce gaps in output data and/or result in the live encoding system failing to deliver output frames when requested. Live encoding systems in accordance with some embodiments of the invention can assess incoming media feeds to determine when gaps have occurred. These assessments can be based on several measures including (but not limited to) incoming frame rate, incoming bit rates, time between arrived frames, and/or network bandwidth measurements. Live encoding systems in accordance with many embodiments of the invention can compensate for detected gaps in data by replicating frames and/or extending frames during repackaging of incoming media streams into several adaptive bitrate streams. By replicating frames and/or extending frames, the live encoding systems can allow network conditions a chance to stabilize without jeopardizing the availability of frames at the requested time that clients depend on. Specifically, the live encoding system can fall behind the live edge of live streamed media. Clients typically request frames from a live stream at the live edge of the presentation. When used herein, the term "live edge" refers to the most recently encoded segments of the live stream that clients can request without the risk of requesting segments that are not yet available. Requesting not yet available segments result numerous streaming errors such as (but not limited) delays, HTTP not found errors, and can result in bandwidth-clogging repeated requests.

Server load levels can affect live encoding processes as well. Where a live encoding system is implemented as a live encoding server, the server hardware can become overwhelmed by encoding processes. Where a live encoding server falls behind the live edge, the several adaptive bitrate streams can fail as the clients rely on requests being made at the live edge. Specifically, live streaming clients can request segments of video based on an assumption that live encoding systems generate the segments not slower than real time. Live encoding systems in accordance with many embodiments of the invention can compensate for server load by extending current frames and adjusting timestamps of output frames. The extended frames can produce minor and/or difficult to perceive visual errors but will preserve the request and receive HTTP cycle clients depend on for live streaming. Moreover, live encoding systems in accordance with embodiments of the invention can also compensate for server load by replicated current frames and adjusting their frame contexts as necessary for the output streams.

Having discussed a brief overview of the operations and functionalities live encoding systems in accordance with many embodiments of the invention, a more detailed discussion of systems, servers, and methods for live encoding systems in accordance with embodiments of the invention follows below.

Network Architectures for Live Encoding Systems

A network architecture for a live encoding system in accordance with an embodiment of the invention is illustrated in FIG. 1. System 100 includes live encoding servers and supporting hardware 102 that includes application servers, database servers, and/or databases as necessary to support live encoding. The live encoding servers and supporting hardware 102 can receive live media content and/or non-live content from content sources 114. Content sources 114 can include hardware use to provide media to live encoding servers and supporting hardware 102. The media received from content sources 114 can include (but is not limited to) web streams, live media broadcasts, television broadcasts, live event coverage, video feeds from live cameras, previously stored media, raw media feeds, encoded media feeds, and/or static files received from local and/or remote storages.

The live encoding servers and supporting hardware 102 can communicate over network 104 with several groups of devices in order to provide streams of content. The groups of devices include (but are not limited to) web, file, and/or Media Servers 106, computing devices 108, and/or mobile devices 112. Users of the devices from these groups of devices can view provided streaming content utilizing local streaming clients. In addition, a web server from web, file, and/or Media Servers 106 can also serve as hosts for additional downstream viewers and/or clients of the provided streaming content.

As illustrated in FIG. 1, live encoding servers and supporting hardware 102 includes application servers, database servers, and databases. In various embodiments, live encoding servers and supporting hardware 102 can include varying numbers and types of devices. For instance, live encoding servers and supporting hardware 102 can be implemented as a single computing device where the single computing device has sufficient storage, networking, and/or computing power. However, live encoding servers and supporting hardware 102 may also be implemented using multiple computing devices of various types and multiple locations. For instance, live encoding servers and supporting hardware 102 may be implement as a live encoding server for encoding live media and an HTTP server for responding to HTTP requests for segments encoded by the live encoding server. While live encoding servers and supporting hardware 102 is shown including application servers, database servers, and databases, a person skilled in the art will recognize that the invention is not limited to the devices shown in FIG. 1 and can include additional types of computing devices (e.g., web servers, and/or cloud storage systems).

In the embodiment illustrated in FIG. 1, network 104 is the Internet. Live encoding servers and supporting hardware 102 can receive requests and transmit media segments to and from mobile devices 112 through network 104 and over a wireless connection 110. Wireless connection 110 can be (but is not limited to) a 4G connection, a cellular network, a Wi-Fi network, and/or any other wireless data communication link appropriate to the requirements of specific applications. Live encoding servers and supporting hardware 102 can communicate directly with computing devices 108 and web, file, and/or Media Servers 106 through network 104. Other embodiments may use other networks, such as Ethernet or virtual networks, to communicate between devices. A person skilled in the art will recognize that the invention is not limited to the network types shown in FIG. 1 and can include additional types of networks (e.g., intranets, virtual networks, mobile networks, and/or other networks appropriate to the requirements of specific applications).

Although a specific architecture is shown in FIG. 1, different architectures involving electronic devices and network communications can be utilized to implement live encoding systems to perform operations and provide functionalities in accordance with embodiments of the invention.

Systems and Processes for Live Encoding Servers

In live encoding systems, clients often rely on being able to request and receive frames at the live encoding edge. Any interruptions in encoding and/or transmission can result in clients failing to received needed frames, failed HTTP requests, image stuttering, and general frustration by the viewers. Live encoding systems in accordance with numerous embodiments of the invention can use real time analysis of incoming media and/or encoding system loads to mitigate losses and interruptions in live encoding through techniques discussed below.

Figure 2:
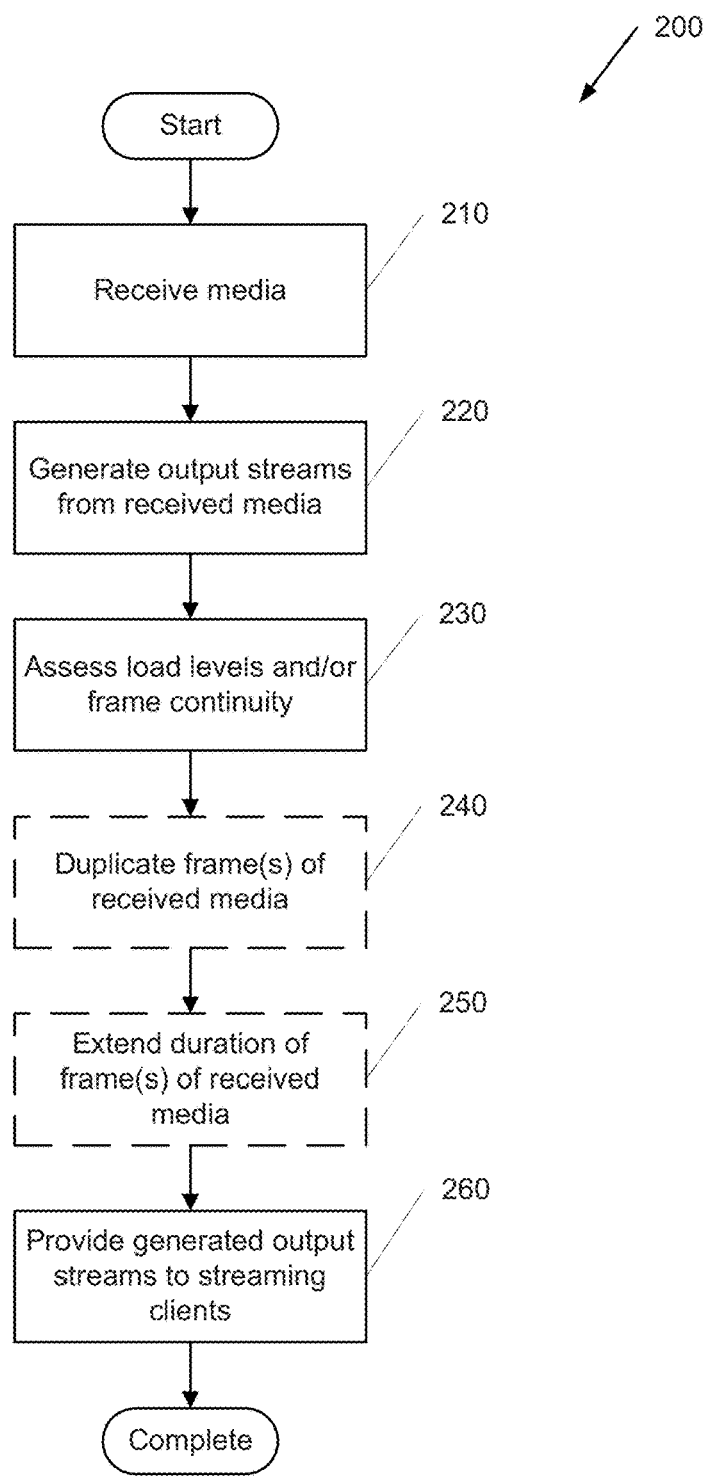
FIG. 2 is a flow chart illustrating a high level process performed by a live encoding system in accordance with an embodiment of the invention.

FIG. 2 conceptually illustrates a process 200 that can be performed by live encoding systems in accordance with embodiments of the invention in receiving media, generating streams, and providing the generated streams to live streaming clients. In a number of embodiments, the process 200 is performed by a live encoding server in accordance with the embodiment described above in connection with FIG. 1. In particular, process 200 can be performed by an MPEG-DASH live encoding server during continuous live encoding and live streaming of media.

Media can be received (210). As mentioned above, media can encompass numerous different types, formats, standards, and/or presentations. Often, the received media is a live feed of already encoded media. The received media can include (but not limited to) input streams, live media feeds, television feeds, satellite feeds, web streams, and/or static files received from local and/or remote storages.

Streams can be generated (220) from the received media. The generated streams can be of many possible formats, such as (but not limited to) MPEG-DASH, H.264/AVC, HTTP Live Streaming, Smooth Streaming, and/or any other adaptive bitrate format. The generated streams can then be provided to streaming clients over a network connection. Typically, the generated streams will be of different maximum bitrates and be encoded according to varying encoding parameters. In some embodiments, streams are generated utilizing a repackaging application of a live encoding server. The repackaging application repackages received media into output streams. Thereby, the repackaging application can utilize utilizing various encoders and decoders as necessary to generate as necessary to generate the streams.

The generation of streams can be a continuous process that is performed as live media is received. During continuous generation of streams in response to receipt of live media, load levels on the live encoding system, load levels in a communication network, gaps in receipt of media, and/or gaps in generation of streams can be assessed (230). Moreover, different embodiments may assess other aspects of live encoding server operations. Performing said assessments can include several sub-operations. For instance, the live encoding system can check incoming data rates and/or frame rates of the received media. The incoming data rates and/or frame rates of the received media can be compared to frame times determined according to internal logic of the live encoding system. The internal logic can include several sources of determining a reliable time, such as (but not limited to) time stamps of the received media, clock implementations on the live encoding system, and/or the declared frame rate of the received media. In some embodiments, the live encoding systems can measure differences in times between incoming frames in order to calculate an overall incoming data rate. The live encoding systems can then monitor the calculated overall incoming data rate to identify gaps in incoming data or potential surges that may overwhelm the processing power of the live encoding system. One or more of these assessments can indicate that the live encoding system has not received a frame at a proper time and/or will fail to encode a frame in time to meet the live edge requirement for live encoding systems.

In order to mitigate the risk of failing to generate frames in time for the live edge, frames of received media can optionally be duplicated and/or replicated (240). In some embodiments, the duplicated frames can be modified to account for new frame contexts associated with the various generated streams. Different frame contexts can include (but are not limited to) different resolutions, different frames types (such as I-frames, B-frames, and/or P-frames), different maximum bitrates. Generation of streams from received media often involves re-encoding the received media to a different format where the received media includes encoded frames. Re-encoding of the received media can be among the more resource intensive operations performed by live encoding systems. The duplicated frames can then be utilized in the generated streams without a relatively costly re-encoding operation. Moreover, the duplicated frames can also be duplicated from raw frames from the received media in addition to encoded frames from the received media.

However, replicating encoded frames instead of re-encoding the frames as a part of a live encoding process can result in the output streams violating certain requirements of the hypothetical reference decoder (HRD) in H.264/AVC. By definition, the HRD shall not overflow nor underflow when its input is a compliant stream. Replicating a large encoded frame and utilizing the replicated stream in a low maximum bitrate stream risks causing a buffer overflow that would fail the HRD requirements. However, software decoder clients can compensate for this without a problem due to their more flexible buffers. The software decoder clients will can require additional CPU cycles to process the replicated frames. Hardware decoder clients will encounter errors due to possible buffer overflows when replicated frames are used in lower maximum bitrate streams. Some embodiments of the invention provide for reducing the bit values of replicated frames for lower maximum bitrate output streams in order to mitigate against the risk of buffer overflows in hardware decoders. In yet other embodiments, duplicated frames are only used for their own specific maximum bitrate output streams; thereby preventing high bit value frames from being utilized low maximum bitrate streams. This can be accomplished by including separate encoding processes for each output stream.

Moreover, in some embodiments, frames can be replicated and/or duplicated from input streams where the input stream and the output stream share same formats, maximum bitrates, and/or resolutions. This can occur where the desired output stream is the same as the input stream. Where this occurs, re-encoding can be skipped and several embodiments can simply replicated the instantaneous decoding refreshes (IDR) frames from the input streams. As discussed above, the resulting output stream can be non-HRD compliant in said several embodiments.

In a further technique to mitigate the risk of failing to generate frames in time for the live edge, frames of received media can optionally be extended (250). Extending frames can include packaging a given frame into an output stream at times different than the given frame's assigned time stamp. Depending on previous assessments, different extensions of frames may occur. Where a gap is detected in feeding and/or receiving of media, a current frame may be extended in generation of the output streams. In embodiments utilizing a repackaging application as a part of a live encoding server, the repackaging application can perform the extension during repackaging of frames into output streams. In order to reduce visual artifacts and/or perceptual stalls in video, the repackaging application can spread several smaller frame extensions over multiple frames in order to compensate for the gap in multiple steps. The smaller extensions can serve to conceal the extensions from streaming client viewers.

The generated output streams can be provided (260) to streaming clients. The generated output streams can be at different maximum bitrate yet each represent a single media presentation. Thus, a given media presentation can be provided to streaming clients in several streams having different maximum bitrates. The provision of generated output streams can be accomplished via HTTP requests for segments from the generated output streams.

While the operations presented in process 200 are presented in a linear order, various embodiments can perform said operations in varying orders. For instance, the generation and provision of streams to clients can be performed continuously as live media is received. Thus, the order of operations presented in process 200 is merely demonstrative and can be performed continuously as a part of a cyclical process for live generation of streams from frames of received media. Having discussed an overview of processes performed by live encoding systems of some embodiments, the following discussion will provide several examples of frame extension and frame replication that can performed as a part of said processes.

Examples of Frame Extension and Frame Replication

As discussed above, live encoding systems in accordance with embodiments of the invention can extend frames and/or replicate frames in response to assessed network and/or server conditions. Frame extensions and/or frame replications can compensate for dropped input frames, delayed input frames, and/or encoding system load. FIG. 3, FIG. 4, FIG. 5, FIG. 6, and FIG. 7 conceptually illustrate several examples of frame extension and frame duplication in accordance with embodiments of the invention. The examples presented in the aforementioned figures are abstractions of the live encoding process illustrated to show the effects of frame replications and/or frame extensions. Live encoding systems in accordance with embodiments of the invention will include additional details, components, and/or functionalities not illustrated in the examples in FIG. 3, FIG. 4, FIG. 5, FIG. 6, and FIG. 7. The specific numbers for time stamps, frame numbers, and/or frame durations are presented for demonstrative purposes. Embodiments of the invention are not limited to the specific values presented in FIG. 3, FIG. 4, FIG. 5, FIG. 6, and FIG. 7 and can incorporate wide ranges of possible time stamps, frame numbers, and/or frame durations as required for live encoding operations. Moreover, while only a single output stream is shown in the following figures, embodiments of the invention typically generate multiple output streams at varying maximum bitrates with varying encoding parameters.

Figure 3:
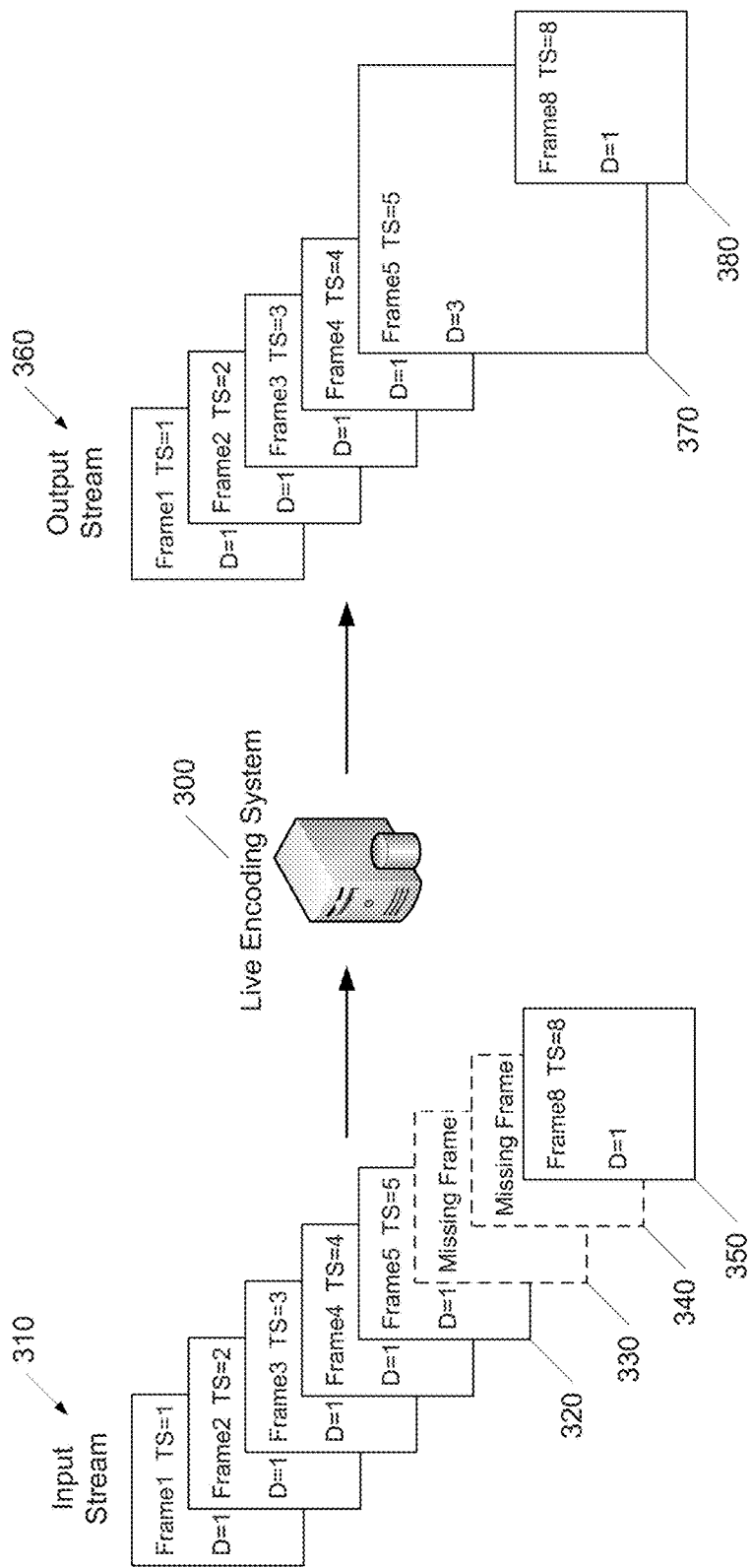
FIG. 3 conceptually illustrates an example a live encoding system extending frames to compensate for missing input frames in accordance with an embodiment of the invention.

FIG. 3 conceptually illustrates an example a live encoding system extending frames to compensate for missing input frames in accordance with an embodiment of the invention. As shown, live encoding system 300 in receiving an input stream 310 and generating an output stream 360. In the example illustrated in FIG. 3, the live encoding processes of live encoding system 300 are performed during continuous receipt of input stream 310 and generation of output stream 360. Input stream 310 can be any of the input streams and/or media discussed above. Live encoding system 360 can provide the generated output stream 360 to streaming clients (not shown) via any of the techniques discussed above. Techniques such as receiving HTTP requests and transmitting segments from the output stream.

As shown, input stream input stream 310 includes several frames with identified time stamps and durations. The frames can include portions of media, such as frames video. Time stamps are indicated by the abbreviation "TS". Durations are indicated by the abbreviation "D". As mentioned previously, the values shown in FIG. 3 are demonstrative. Embodiments of the invention can receive and process various different time stamp and duration values as necessary to support live encoding. Frame 5 320 has a time stamp value equal to 5 and a duration value equal to 1.

Live encoding system 300 expects to receive frames from input stream 310 at specified times. When frames are not received at the specified times, live encoding system 300 may not be able to generate the output stream 360 in time for the live edge expected by live streaming clients. Live encoding system 300 can assess whether frames are missing from the input stream 310 using a variety of measures as discussed above. Such as comparing internal clocks maintained by the live encoding system 300 to the time stamps of the received frames of the live input stream 310. Live encoding system 310 can also include thresholds for missing frames that must be met before extending frames. Live encoding system 310 includes a threshold of two missing frames before electing to extending frames to compensate for the at least two frame gap. Different embodiments may include different thresholds that can be based on a different number of frames and/or a different threshold measurement, such as missing frames over a segment of time instead of missing frames in sequence. Live encoding of video is inherently a resource intensive process, thus various embodiments can utilize a variety of thresholds in connection with assessing encoding conditions, such encoding system loads, client stuttering, network bandwidth stability, video quality, and other metrics and/or conditions that can affect live encoding of video. As discussed above, specific counts of frames and their delivery can be calculated and compared to different thresholds of frame counts and times in different embodiments of the invention. Furthermore, different embodiments can use different metrics for assessing such streaming conditions, processing cycle counts, time benchmarks for encoding of sets of frames, network transfer rates, delivered and displayed framerates, and various measurements of visual quality/fidelity. While specific values are not provided herein, different specific values (such as dips below 24 frames per second, visual errors causing display failures in excess of certain gamma values, frames encoded per second, etc.) can be utilized as necessary to implement the invention without departing from the spirit of the invention.

Input frames can go missing under a variety of different circumstances, such (but not limited to) when there is a failure in the network connection between the provider of the input stream and the live encoding system, when there is fault in the input stream, and/or internal errors of the live encoding system. As shown, input stream 310 is missing frames 330 and frames 340. Live encoding system 300 can detect this gap by comparing the time stamp of frame 8 350 to the time stamp of frame 5 320 and an internal clock maintained by live encoding system 300. Once the missing frame threshold is met, live encoding system 300 can extend frames to compensate for the gap in frames. Various embodiments can use different thresholding schemes, including any of those discussed above.

As shown, live encoding system 300 extends frame 5 320 from the input stream 310 in generating output stream 360. Extended frame 370 is extended to have a duration value equal to 3 in order to cover the missing frames 330 and 340. Extended frame 370 will be available when requested by live streaming clients and preserves the live edge required to support uninterrupted live streaming. However, extending frame durations can result in visual artifacts if used excessively.

Figure 4:
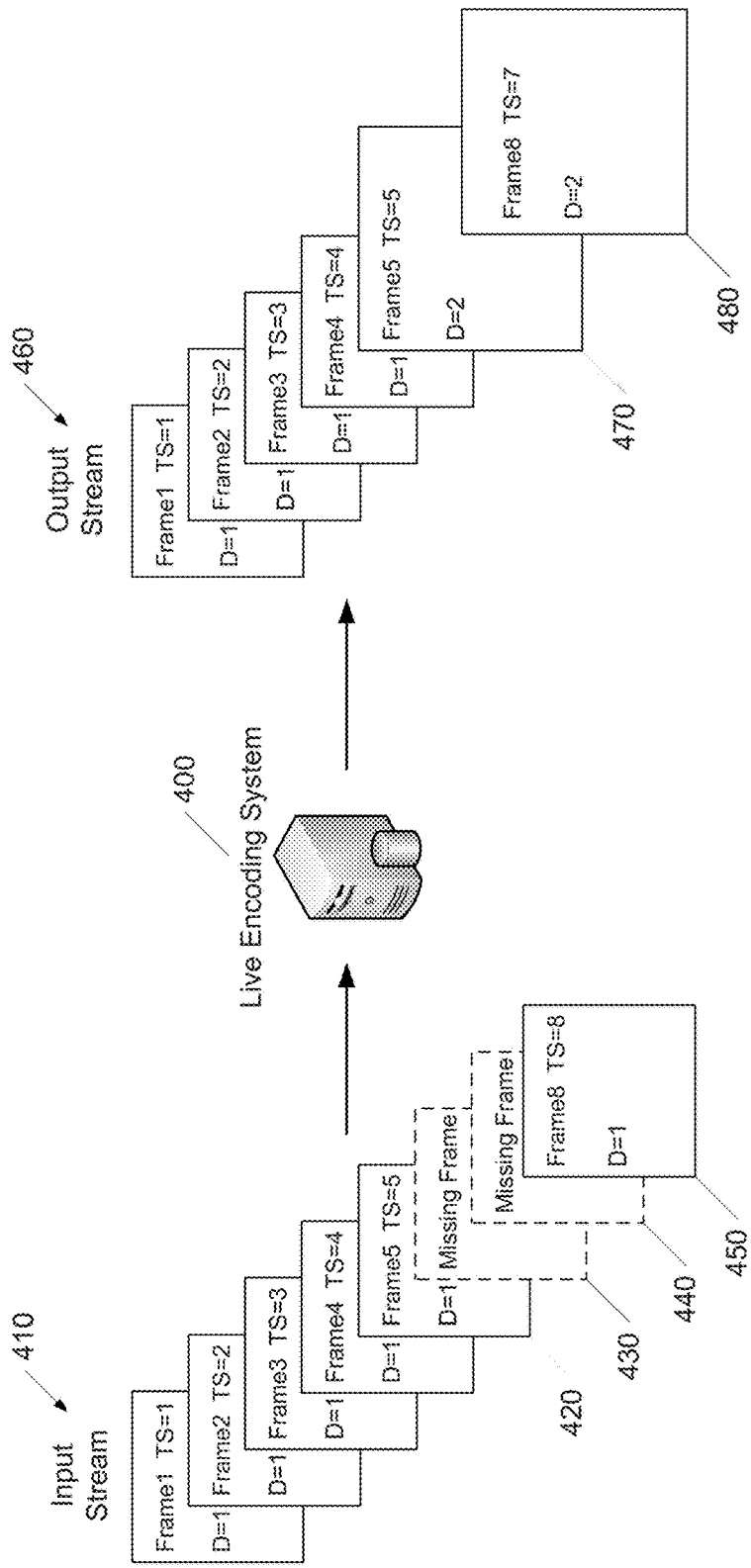
FIG. 4 conceptually illustrates an alternative example a live encoding system extending frames to compensate for missing input frames in accordance with an embodiment of the invention.

FIG. 4 conceptually illustrates an alternate method of extending frame durations that helps to conceal the effects of frame extensions. As shown, live encoding system 400 is generating an output stream 460 from an input stream 410. Input stream 410 is missing frames 430 and 440. In order to compensate for this gap, live encoding system 400 can extend the durations of frame 5 420 and frame 8 450, and also adjust the time stamp value of frame 8 450. As shown in output stream 460, extended frame 5 470 has been extended to have a duration value of 2 and extended frame 8 480 has been extended to have a duration value of 2 as well. However, the time stamp for extended frame 8 470 has been adjusted to be at 7 such that extended frame 8 480 will be available immediately after extended frame 5 470. By distributing extensions around missing frames, live encoding system 400 can conceal some of visual artifacts cause by frame duration extensions.

Figure 5:
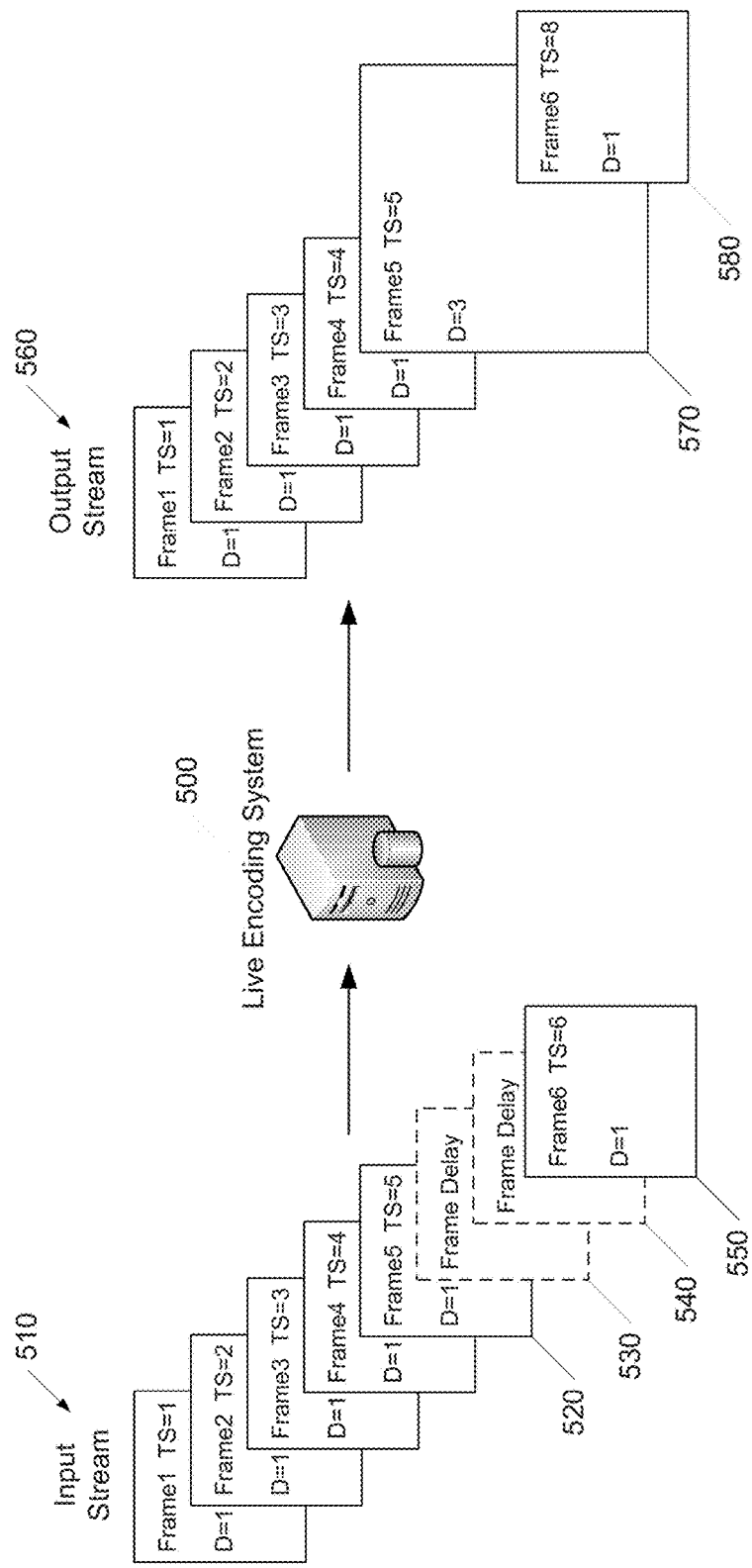
FIG. 5 conceptually illustrates an example of a live encoding system extending frames to compensate for delayed input frames in accordance with an embodiment of the invention.

FIG. 5 conceptually illustrates an example a live encoding system extending frames to compensate for delayed input frames in accordance with an embodiment of the invention. As shown, live encoding system 500 is generating output stream 560 from input stream 510. However, frame delays 530 and 540 result in frame 6 550 arriving late. Live encoding system 500 can detect the frame delay and use frame duration extension to compensate. Unlike previous examples, there will be no lost frames. Live encoding system 500 generates output stream 560 which include extended frame 5 with a duration extended to 3 and frame 6 580 with a time stamp value adjusted to 8. Extended frame 570 will be available when requested by live streaming clients and preserves the live edge required to support uninterrupted live streaming. Similarly to the examples discussed above, extending frame durations can result in visual artifacts if used excessively.

Figure 6:
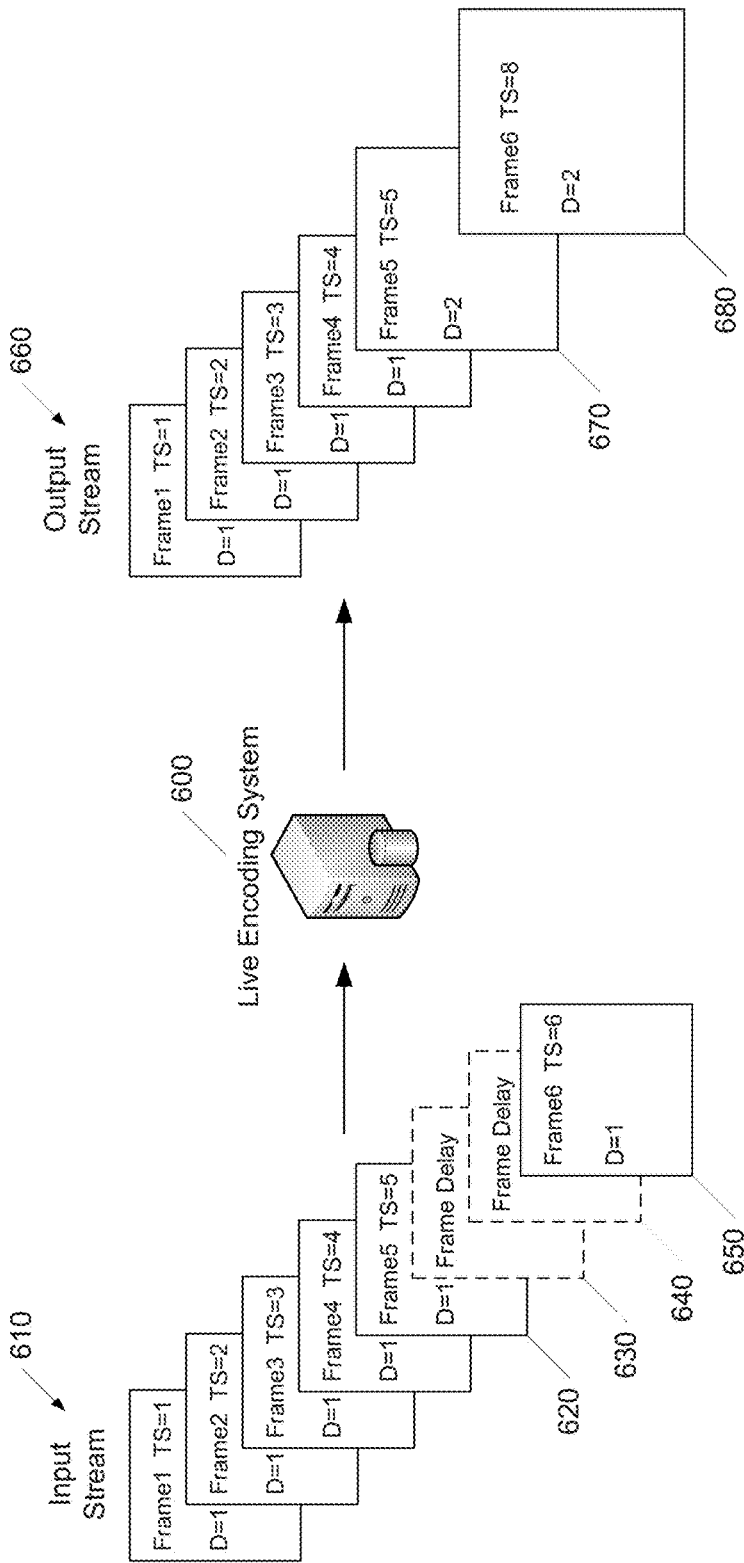
FIG. 6 conceptually illustrates an alternative example of a live encoding system extending frames to compensate for delayed input frames in accordance with an embodiment of the invention.

FIG. 6 conceptually illustrates an alternate method of extending frame durations to compensate for frame delays that helps to conceal the effects of frame extensions. As shown, live encoding system 600 is generating an output stream 660 from an input stream 610. As above, frame delays occur at 630 and 640. In order to compensate for this delay, live encoding system 600 can extend the durations of frame 5 620 and frame 6 650, and also adjust the time stamp value of frame 6 650. As shown in output stream 660, extended frame 8 670 has been extended to have a duration value of 2 and extended frame 8 has been extended to have a duration value of 2 as well. However, the time stamp for extended frame 8 670 has been adjusted to be at 7 such that extended frame 8 670 will be available immediately after extended frame 5 670. By distributing extensions around delayed frames, live encoding system 400 can conceal some of visual artifacts cause by frame duration extensions.

Embodiments of the invention are not limited to the frame extensions techniques discussed above with respect to FIG. 3, FIG. 4, FIG. 5, and FIG. 6. Various embodiments can utilize sequential extensions of frame durations as shown in FIG. 3 and FIG. 5 and/or interspersed extensions of frame durations as shown in FIG. 4 and FIG. 5 in different circumstances. Furthermore, extending frame durations is not limited to being performed due to missing and/or delayed frames.

Figure 7:
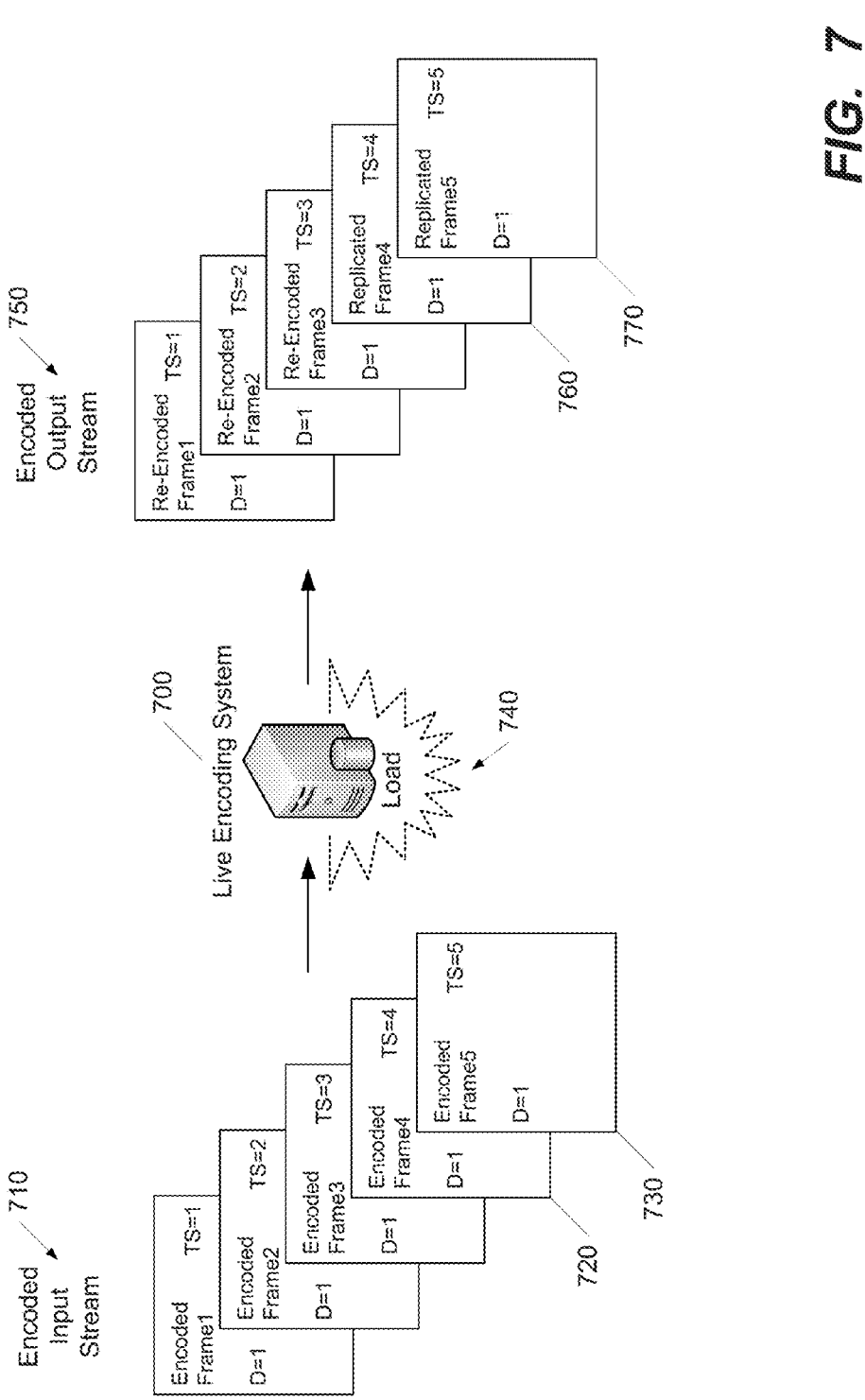
FIG. 7 conceptually illustrates an example of a live encoding system replicating frames to compensate for system load in accordance with an embodiment of the invention.

Live encoding servers typically are very powerful and expensive machines that need significant computing power to encoding live streams that meet the live edge requirement. However, even powerful servers can become overloaded and lesser servers even more so. In particular, re-encoding encoded frames can be a serious drain on server resources. FIG. 7 conceptually illustrates an example a live encoding system extending frames to compensate for server load in accordance with an embodiment of the invention. As shown, live encoding system 700 in receiving an input stream 710 and generating an output stream 760. In the example illustrated in FIG. 7, the live encoding processes of live encoding system 700 are performed during continuous receipt of input stream 710 and generation of output stream 760. Live encoding system 700 is shown under load 740. In order to compensate for this load, live encoding system 700 can replicate frames from encoded input stream in the encoded domain.

As shown, live encoding system 700 receives encoded frame 4 720 and encoded frame 5 730. Live encoding system 700 replicates these frames in generating encoded output stream 750. Frame fields for replicated frame 4 760 and replicated frame 5 770 may have to be adjusted in order to account for the new frame context. However, these adjustments can require significantly less processing resources as compared to re-encoding operations. Replicated frame 4 760 and replicated frame 5 770 have the same duration values and time stamp values as encoded frame 4 720 and encoded frame 5 730.

Embodiments of the invention are not limited to the specific frame replication techniques discussed above in the example conceptually illustrated in FIG. 7. Various embodiments can utilize frame replication and/or duplication with various formats of input streams, such as raw, un-encoded input streams. Moreover, embodiments of the invention are not limited to performing frame replication and/or frame duplication only during times of server load. For instance, some embodiments of the invention can perform encoded frame replication as a part of a continuous encoding process to maintain efficient live encoding without waiting until server load reaches critical levels. Said some embodiments could be utilized on lower powered live encoding servers.

MPEG-DASH Live Encoding

MPEG-DASH (ISO/IEC 23009-1) is a standard for streaming multimedia content over the internet. MPEG-DASH was developed by the Moving Picture Expert Group (MPEG). MPEG has been responsible for developing previous multimedia standards, including MPEG-2, MPEG-4, MPEG-7, MPEG-21 and others. MPEG-DASH provides for adaptive segmented media delivery using HTTP. The MPEG-DASH specification only defines the MPD and the segment formats. Of note, the delivery of the MPD and the media-encoding formats containing the segments, as well as the client behavior for fetching, adaptation heuristics, and playing content, are undefined within the MPEG-DASH standard.

Figure 8:
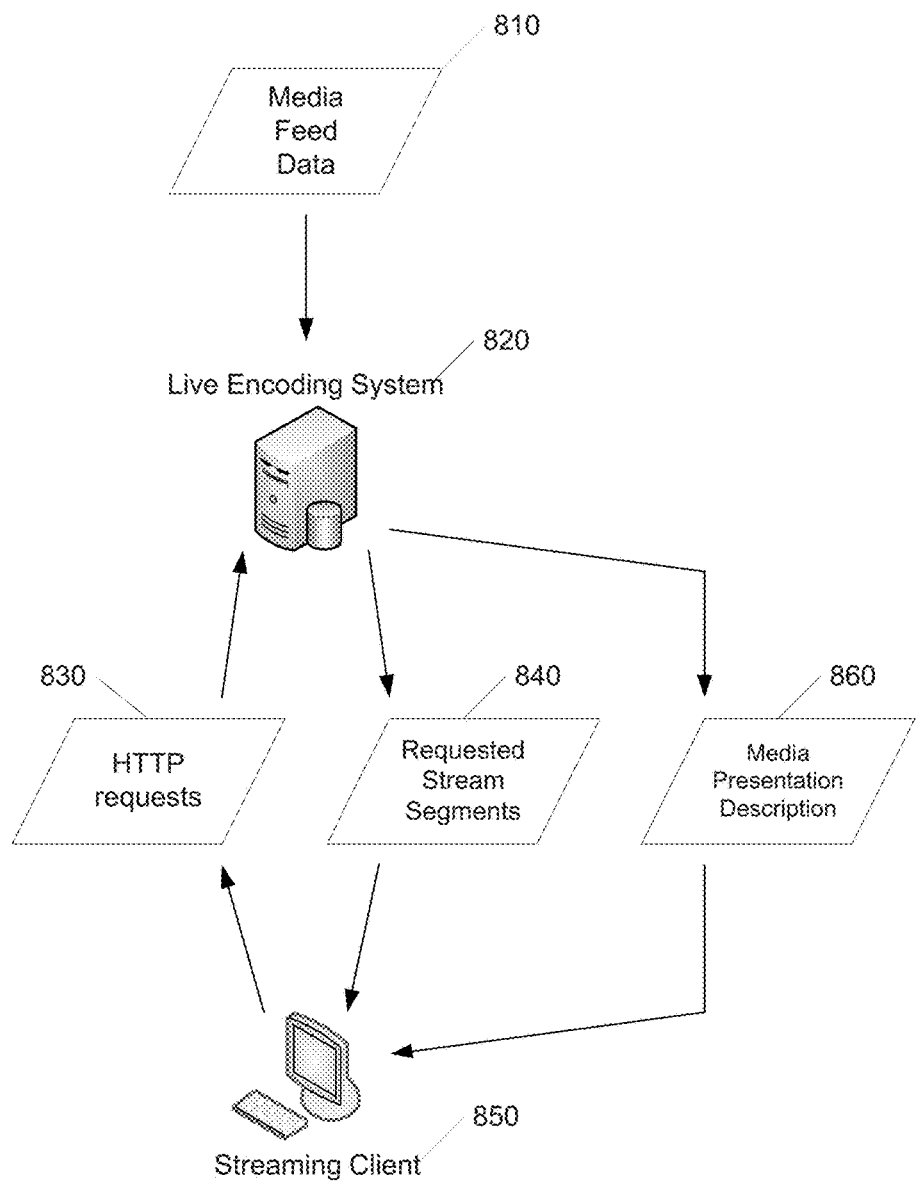
FIG. 8 is a data flow diagram for a live encoding system and a streaming in accordance with an embodiment of the invention.

FIG. 8 conceptually illustrates an example data flow diagram for a live encoding system utilizing MPEG-DASH in accordance with an embodiment of the invention. FIG. 8 includes a media feed data 810, a live encoding system 820, a HTTP requests 830, requested stream segments 840, a streaming client 850, and media presentation description 860. Though not shown, media feed data 810, HTTP requests 830, requested stream segments 840, and media presentation description 860 can be transmitted over a communication network. The communication network can include (but is not limited to) the internet.

As shown, live encoding system 820 is receiving media feed data 810. Media feed data 810 can include at least the types of received media discussed above. Live encoding system 820 can generate output streams from the received media feed data 810. During generation of the output streams from the received media feed data 810, live encoding system 820 can replicate frames from the media feed data 810 and/or extend frames from the media feed data 810 based on assessments of the rate of receipt of media feed data 810, load levels on the live encoding system 820, load levels in the communication network supporting the transmission of media feed data 810, gaps in the media feed data 810, and/or gaps in generation of streams by the live encoding system 820.

Live encoding system 820 also receives HTTP requests 830. In response to the HTTP requests, live encoding system 820 provides requested stream segments 840. HTTP requests 830 can include byte range requests for a specific segment from one of the generated output streams. Live encoding system 820 can include multiple components, including separate live encoding servers and HTTP servers. The HTTP servers can support the HTTP communication of media segments and requests with clients. Moreover, the HTTP servers can utilize HTTP-based Content Distribution Networks (CDNs) to assist in delivery of media segments to streaming client 850.

MPEG-DASH uses a Media Presentation Description (MPD) to provide clients with a well structured XML manifest describing several adaptive bitrate streams that can be accessed via HTTP requests for stream segments. Each MPD corresponds to a single media presentation that can be viewed via the several described adaptive bitrate streams. The MPD describes accessible media segments and corresponding timings for the accessible media segments. The MPD is a hierarchical data model including (descending from the top of the hierarchy) a media presentation, periods, adaptation sets, representations, and segments. A media presentation can include to a live broadcast, a live stream, a live event, and/or a pre-recorded media presentation. A media presentation can be spliced and/or include several periods. The periods are by default unlinked and can have advertising periods spliced between them without any loss of functionality. Periods can include several adaptation sets. Adaptation sets can include different perspectives on the same presentation, such as different cameras from a live sporting event. In addition, different adaptation sets can include different formats, such as audio adaptation sets and video adaptation sets. Within each adaptation set, several representations may be included. Representations support the selection of different bandwidth and/or maximum bitrate levels form the same presentation. Thus, clients of MPEG-DASH can use adaptive bitrate streaming by switching to different representations as bandwidth and/or client loading allows. Each representation includes segments of media that can be requested via HTTP. The HTTP requests are received on pre-formatted URLs associated with each segment.

Figure 9:
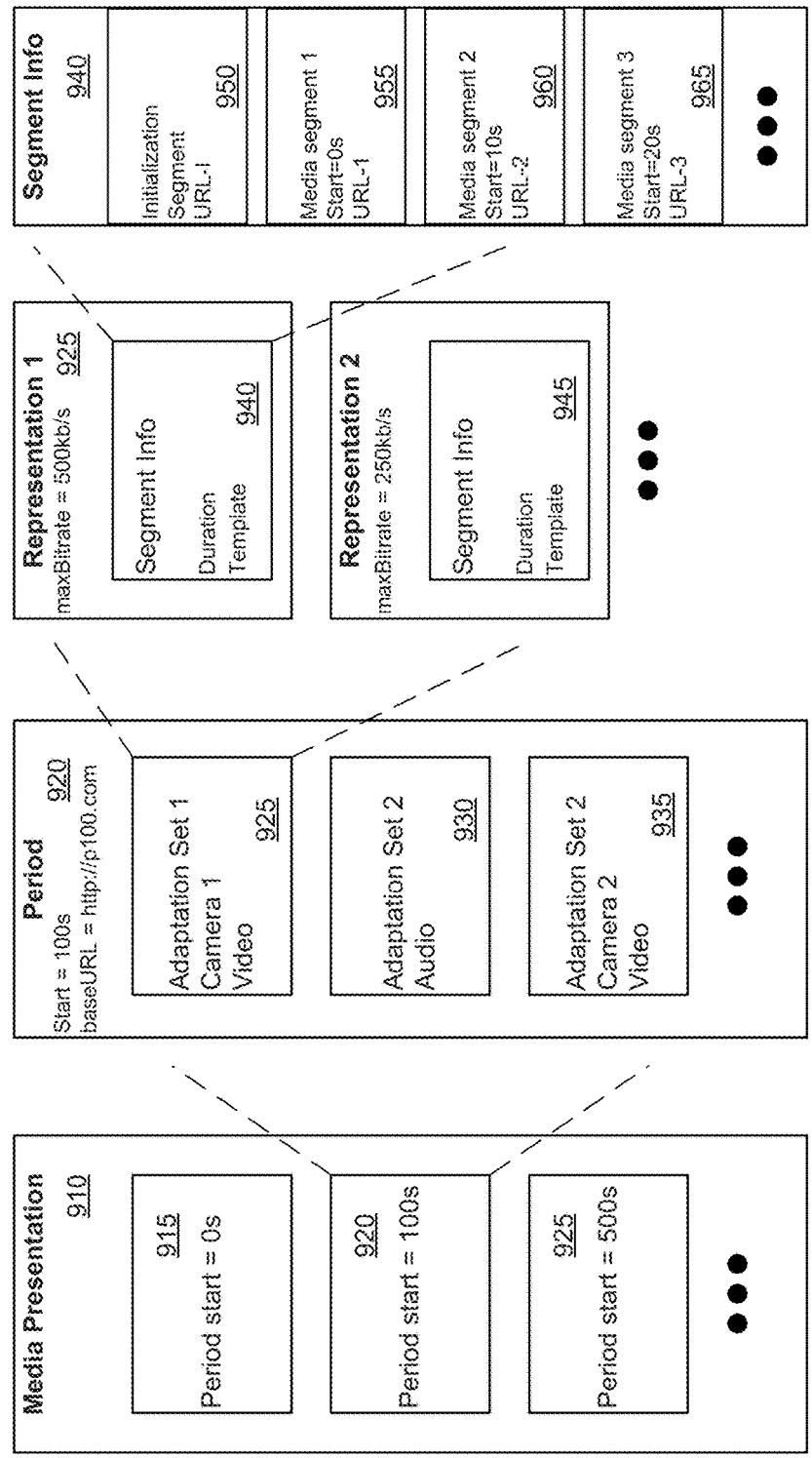
FIG. 9 is an example of a Media Presentation Description (MPD) data model for MPEG-DASH that can be utilized by embodiments of the invention.

FIG. 9 conceptually illustrates an example Media Presentation Description MPD data model from MPEG-DASH. As shown, media presentation 910 includes several periods 915-925. The periods 915-925 each include different period start times. Period 920 at start time 100 seconds is expanded to show several included adaptation sets 925-930. Adaptation set 1 925 includes video from camera 1 of media presentation 910. Adaptation set 2 930 includes audio for media presentation 910. Adaptation set 3 935 includes video from camera 2 of media presentation 910. Adaptation set 1 925 has been expanded to show representation 1 940 and representation 2 945. Representation 1 940 is a 500 kb/s representation for adaptation set 1 925 whereas representation 2 945 is a 250 kb/s representation for adaptation set 1 925. Within representation 1 940 are initialization segment 100 and media segments 955-965. These segments are requested by streaming clients via HTTP to receive the media contained within them.

Of note, instances of ellipses illustrated in FIG. 9 indicate the possibility of additional periods, adaptation sets, presentations, and segments. The example MPD presented in FIG. 9 is merely one possible example from any variety of configurations supported by various embodiments of the invention. For instance, different embodiments of the invention can support many other maximum bitrates than those provided for demonstrative purposes in the embodiment illustrated in FIG. 9.

Live Encoding Server Architecture

Figure 10:
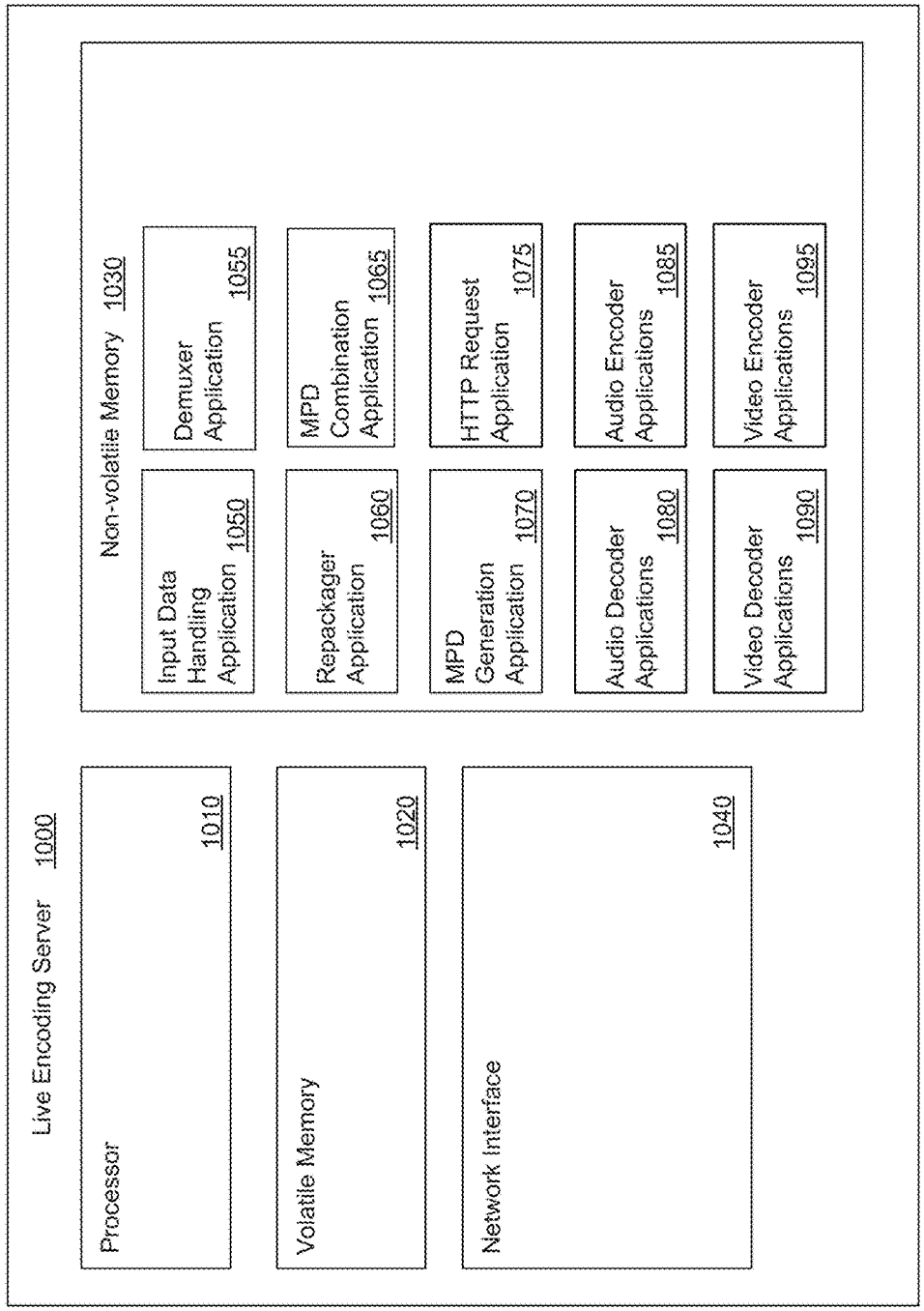
FIG. 10 conceptually illustrates an architecture of a live encoding server in accordance with an embodiment of the invention.

An architecture of a live encoding server 1000 in accordance with an embodiment of the invention is illustrated in FIG. 10. The live encoding server 1000 includes a processor 1010 in communication with non-volatile memory 1030, volatile memory 1020, and a network interface 1040. In the illustrated embodiment, the non-volatile memory includes input data handling application 1050, demuxer application 1055, repackager application 1060, MPD combination application 1065, MPD generation application 1070, HTTP request application 1075, audio decoder application 1080, audio encoder application 1085, video decoder application 1090, and video encoder application 1095. Of note, the live encoding server 1000 is an mpeg-dash format live encoding server that prepares MPD files for streams and provides segments of output streams to streaming clients through HTTP requests. Other embodiments may utilize different formats and include different applications as necessary to support said different formats.

The input data handling application 1050 receives input streams from the network interface 1040. The input streams can include (but are not limited to) live streams of video content, media presentations, video only files, audio only files, sporting events, web streams, and/or mpeg-dash standard streams. The input data handling application 1050 can perform additional functions including identification of the input streams. Identification can be performed using metadata included with the input streams and/or assessing of characteristics and parameters of the input streams.

The demuxer application 1055 demultiplexes individual elementary streams from an input stream. For instance, the demuxer application 1055 can break out the audio, video, and/or subtitle streams within an input stream. The demultiplexed streams can be analyzed, decoded, and reencoded in subsequent operations performed by other applications.

The repackager application 1060 can perform the re-encoding, duplication, and frame extension operations as a part of the overall live encoding server operations. The repackager application 1060 can receive input streams from the input data handling application 1050, the demuxer application 1055, the network interface 1040, and/or any other component of the live encoding server 1000 as necessary to repackage streams. The repackager application 1060 can re-encode incoming live frames of received media into several output streams utilizing the video decoder application 1090 and the video encoder application 1095 as necessary. During re-encoding operations, the repackager application 1060 can assess network and/or server load levels of the live encoding server 1000 according to several measures. Based on these assessments, the repackager application 1060 can duplicate incoming frames to reduce server load levels and/or extend certain frames to compensate for anticipated drops in incoming network bandwidth. The repackager application 1060 can extend frames by manipulating time codes and/or time stamps of frames to increase their duration in output streams. The repackager application 1060 can provide the repackaged, re-encoded, duplicated, and/or extended frames of output streams to the MPD combination application 1065 and/or the MPD generation application 1070 for preparation for later streaming to clients utilizing the HTTP request application 1075.

The MPD combination application 1065 combines multiple output streams generated by the repackager application 1060 into a single presentation. The MPD combination application 1070 can generate an MPD file for a combined presentation. As discussed above, the MPD file can describe the periods, adaptation sets, representations, and segments of a media presentation. The MPD combination application 1070 generates MPD's according to characteristics of the generated output streams. These characteristics will vary according to the operations performed by the repackager application 1060. The MPD file is typically the initially requested and provided to streaming clients in order to initiate an mpeg-dash streaming session.

The HTTP request application 1075 handles HTTP requests and server media segments according to said HTTP requests. The HTTP request application 1075 may communicate to streaming clients through the network interface 1040. In some embodiments, the HTTP request application 1075 is hosted in a separate HTTP server from the live encoding server.

The non-volatile memory includes audio decoder application 1080, audio encoder application 1085, video decoder application 1090, and video encoder application 1095. While non-volatile memory 1030 only includes a single video decoder application 1090 and a single video encoder application 1095, other embodiments may include multiple video encoder and video decoder applications. Moreover, some embodiments may utilize sets of applications for each output stream in order to have separate repackager, decoder, and encoder applications to generate each different output stream.

In several embodiments, the network interface 1040 may be in communication with the processor 1010, the volatile memory 1020, and/or the non-volatile memory 1030. The above discussion of the applications stored in the non-volatile memory 1030 of the live encoding server 1000 discusses one exemplary set of applications to support the live encoding server 1000. Other embodiments of the invention may utilize multiple servers with the functions discussed below distributed across multiple servers and/or locations as necessary to implement the invention. Furthermore, the applications discussed below could be combined into one or more applications and implemented as software modules as necessary to implement the invention. For instance, the applications discussed below could alternatively be implemented as modules of a single application residing on live encoding server 1000. Moreover, where a single application is shown, other embodiments may utilize multiple applications dedicated to similar functions.

The various processes discussed above can be implemented on singular, discrete servers. Alternatively, they can each be implemented as shared and/or discrete servers on any number of physical, virtual, or cloud computing devices. Specifically, live encoding systems in accordance with some embodiments of the invention could include separate encoding server(s) and HTTP server(s). Persons of ordinary skill in the art will recognize that various implementations methods may be used to implement the process servers of embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

The invention claimed is:

1. A method of encoding an encoded input stream into a plurality of adaptive bitrate streams using a live encoding system, the method comprising:
   receiving an encoded input stream using a live encoding system;
   assessing encoding conditions using the live encoding system, wherein assessing encoding conditions using the live encoding system further comprises calculating an amount of load on the live encoding system using the live encoding system; and
   re-encoding a given segment of the encoded input stream into a plurality of adaptive bitrate segments using the live encoding system based on the assessed encoding conditions, wherein each adaptive bitrate segment of the plurality of adaptive bitrate segments is encoded for a different bitrate, wherein re-encoding the given segment of the input stream into the plurality of adaptive bitrate segments comprises:
      extending the time duration of at least one frame having a first duration from the given segment of the input stream in at least one of the plurality of adaptive bitrate segments by modifying a time stamp of a subsequent frame in the at least one adaptive bitrate segment such that the at least one frame has an extended second duration in the at least one adaptive bitrate segment when the assessed encoding conditions satisfy a first encoding load threshold;
      replicating at least one frame from the given segment of the input stream and using the replicated at least one frame from the segment of the input stream in at least one of the plurality of adaptive bitrate segments when the assessed encoding conditions satisfy a second encoding load threshold; and
      re-encoding at least one frame of the given segment of the input stream into the plurality of adaptive bitrate segments using the live encoding system when the assessed encoding conditions do not satisfy either the first or second encoding load thresholds.

2. The method of claim 1 further comprising streaming the encoded plurality of adaptive bitrate segments to a plurality of streaming clients over at least one network.

3. The method of claim 1, wherein assessing encoding conditions using the live encoding system further comprises determining an arrival time between a previous segment and the given segment, and wherein the first threshold is a particular amount of time between the arrival of different segments.

4. The method of claim 3, wherein determining the arrival time between the previous segment and the given segment further comprises comparing time stamp differences between the previous segment and the given segment to a clock implementation on the live encoding system.

5. The method of claim 1, wherein assessing encoding conditions using the live encoding system further comprises calculating an amount of data being received from the input stream using the live encoding system, and wherein the first threshold is a particular quantity of data received over a specified amount of time.

6. The method of claim 1, wherein the plurality of adaptive bitrate segments are encoded into different maximum bitrates.

7. The method of claim 1, wherein the input stream is a live stream.

8. The method of claim 7, wherein the live stream comprises media selected from the group of audio tracks, video tracks, subtitle tracks, and multimedia tracks.

9. The method of claim 1, wherein a given segment of the encoded input stream has a first encoding, wherein re-encoding at least one frame comprises re-encoding the at least one frame to a different second encoding, and wherein replicating at least one frame from the segment of the input stream comprises replicating the at least one frame with the same first encoding.

10. A live encoding system, the live encoding system comprising:
- at least one processing unit;
- a memory storing a live encoding application comprising computer instructions, wherein the live encoding application instructs the at least one processing unit to:
- receive an encoded input stream;
- assess encoding conditions, wherein the instructions to assess encoding conditions further comprises instructions to calculating an amount of load on the live encoding system; and
- re-encode a given segment of the encoded input stream into a plurality of adaptive bitrate segments based on the assessed encoding conditions, wherein each adaptive bitrate segment of the plurality of adaptive bitrate segments is encoded for a different bitrate, wherein the instructions to re-encode the given segment of the input stream into the plurality of adaptive bitrate segments further comprise instructions to:
  - extend the time duration of at least one frame having a first duration from the given segment of the input stream in at least one of the plurality of adaptive bitrate segments by modifying a time stamp of a subsequent frame in the at least one adaptive bitrate segment such that the at least one frame has an extended second duration in the at least one adaptive bitrate segment when the assessed encoding conditions satisfy a first encoding load threshold;
  - replicate at least one frame from the given segment of the input stream and using the replicated at least one frame from the segment of the input stream in at least one of the plurality of adaptive bitrate segments when the assessed encoding conditions satisfy a second encoding load threshold; and
  - re-encode at least one frame of the given segment of the input stream into the plurality of adaptive bitrate segments when the assessed encoding conditions do not satisfy either the first or second encoding load thresholds.

11. The live encoding system of claim 10, wherein the live encoding application further includes instructions to stream the encoded plurality of adaptive bitrate segments to a plurality of streaming clients over at least one network.

12. The live encoding system of claim 10, wherein the instructions to assess encoding conditions further comprises instructions to determine an arrival time between a previous segment and the given segment, and wherein the first threshold is a particular amount of time between the arrival of different segments.

13. The live encoding system of claim 12, wherein the instructions to determine the arrival time between the previous segment and the given segment further comprises instructions to compare time stamp differences between the previous segment and the given segment to a clock implementation on the live encoding system.

14. The live encoding system of claim 10, wherein the instructions to assess encoding conditions further comprises instructions to calculating an amount of data being received from the input stream, and wherein the first threshold is a particular quantity of data received over a specified amount of time.

15. The live encoding system of claim 10, wherein the plurality of adaptive bitrate segments are encoded into different maximum bitrates.

16. The live encoding system of claim 10, wherein the input stream is a live stream.

17. The live encoding system of claim 16, wherein the live stream comprises media selected from the group of audio tracks, video tracks, subtitle tracks, and multimedia tracks.

18. The live encoding system of claim 10, wherein a given segment of the encoded input stream has a first encoding, wherein re-encoding at least one frame comprises re-encoding the at least one frame to a different second encoding, and wherein replicating at least one frame from the segment of the input stream comprises replicating the at least one frame with the same first encoding.

\* \* \* \* \*